UNITED STATES PATENT OFFICE.

CARL BOSCH AND ALWIN MITTASCH, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

PRODUCING AMMONIA.

1,244,580.      Specification of Letters Patent.      Patented Oct. 30, 1917.

No Drawing.      Application filed August 16, 1912. Serial No. 715,332.

*To all whom it may concern:*

Be it known that we, CARL BOSCH and ALWIN MITTASCH, subjects, respectively, of the King of Prussia and the King of Saxony, residing at Ludwigshafen-on-the-Rhine, Germany, have invented new and useful Improvements in Producing Ammonia, of which the following is a specification.

For the production of ammonia from its elements, catalytic agents of various metals, such for instance as iron, cobalt, nickel, molybdenum and tungsten, have been proposed for use. The oxids of these metals are reducible by means of hydrogen and it has consequently been assumed that small quantities of oxygen or water vapor, or other compounds yielding oxygen or water vapor, would not have any effect on the reaction. In fact several authors were of the opinion that only moist gases are capable of giving rise to ammonia (*cf.* Ramsay and Young, *Journal of the Chemical Society*, 45, 93 (1884), Woltereck, German Patent No. 146,712, page 1, lines 62 *et seq.*, Perman, *Proceedings of the Royal Society*, 76, 167 *et seq.* (1905), and Neogi and Adhicáry, *Zeitschrift für Anorganische Chemie*, 69, 208 (1911)).

We have now discovered that the best yields of ammonia, when employing such metal or metals as catalytic agent, can be obtained by passing a mixture of nitrogen and hydrogen, preferably in combining proportions, over such catalytic agent at temperatures not exceeding about 600° C., if the mixture of nitrogen and hydrogen be practically completely freed from water or compounds capable of forming water including for instance free oxygen, and this is the case both when the reaction is carried out under increased pressure and also at atmospheric pressure. For instance, the fine particles of water that are readily carried away by gas when bubbled through an aqueous liquid must be removed, and by the expression water we mean both water as such and in the form of vapor.

One method of treating the gas consists, for instance, in passing it, either at ordinary or at increased pressure, over heated palladium-asbestos and then over quicklime or the like. Other methods, however, can be used for freeing the gases from the undesired impurity.

Now what we claim is:—

1. The process of producing ammonia by freeing a mixture containing nitrogen and hydrogen from water and compounds capable of giving rise to water, and then passing the gas mixture over a catalytic agent containing a metal of the iron group, at a temperature not exceeding about 600° C.

2. The process of producing ammonia by freeing a mixture containing nitrogen and hydrogen from water and compounds capable of giving rise to water, and then passing the gas mixture over a catalytic agent containing iron, at a temperature not exceeding about 600° C.

3. The process of producing ammonia by passing a mixture containing nitrogen and hydrogen over an efficient drying agent, and then passing the gas mixture over a catalytic agent containing iron, at a temperature not exceeding about 600° C.

4. The process of producing ammonia by freeing a mixture containing nitrogen and hydrogen from water and compounds capable of giving rise to water and then passing the gas mixture over iron at a temperature not exceeding about 600° C.

5. The process of producing ammonia by passing a mixture of nitrogen and hydrogen successively over heated palladium-asbestos, quicklime and at a temperature not exceeding about 600° C. a catalytic agent containing iron.

In testimony whereof we have hereunto set our hands in the presence of two subscribing witnesses.

CARL BOSCH.
              ALWIN MITTASCH.

Witnesses:
   ERNEST G. EHRHARDT,
   JOSEPH HUFFER.